Patented Nov. 6, 1945

2,388,507

UNITED STATES PATENT OFFICE 2,388,507

DEHYDRATION OF NITRILES

John W. Teter and Walter J. Merwin, Chicago, Ill., assignors to Sinclair Refining Company, New York, N. Y., a corporation of Maine No Drawing. Application October 6, 1943, Serial No. 505,199

4 Claims. (Cl. 202—42)

This invention relates to the dehydration of nitriles and more particularly to an improved process for the dehydration of the saturated nitriles of 3 to 4 carbon atoms per molecule, i. e., propionitrile and the butyronitriles.

In the preparation and handling of these nitriles, the nitrile product frequently becomes contaminated with water, the presence of which renders the nitrile unsuitable for various purposes.

The purification of these nitriles with respect to water, in large scale operations, has presented a difficult problem. One reason for the difficulty in removing water from the nitriles is the fact that each of these nitriles forms an azeotrope with water so that substantially complete dehydration of the nitrile by fractional distillation has heretofore been impractical, if not impossible.

In accordance with our improved dehydration method we utilized to advantage this peculiarity of these nitriles with respect to their forming of water azeotropes.

The boiling point of substantially pure propionitrile is approximately 97° C. at atmospheric pressure; that of isobutyronitrile is about 103° C.; and that of normal butyronitrile is about 118° C. The boiling point of the unsaturated acrylonitrile at atmospheric pressure is about 78° C. and that of acetonitrile is about 82° C.

The water azeotrope of acrylonitrile has been found to boil at about 70° C. at atmospheric pressure, that of acetonitrile at about 76° C., that of propionitrile at about 81.5–83° C., that of isobutyronitrile at about 82.5° C., and that of normal butyronitrile at about 87.5° C.

It will be observed that the water azeotrope of each of these nitriles boils at a temperature lower than the boiling point of any of the pure saturated nitrile containing 3 or 4 carbon atoms per molecule.

Further, we have found that the water azeotrope of each of these nitriles carries with it a relatively large proportion of water. The approximate proportion of water, by weight, contained in the water azeotropes of the respective nitriles is set forth in the following tabulation:

| Water azeotrope of: | Per cent water |
|---|---|
| Acetonitrile | 16 |
| Acrylonitrile | 13 |
| Propionitrile | 24 |
| Iso-butyronitrile | 23 |
| Normal butyronitrile | 31 |

A further characteristic of each of these nitriles, with the exception of acetonitrile, is the relatively low mutual solubilities of the respective nitriles and water.

A still further notable characteristic of these nitriles is that neither forms a ternary azeotrope with water and either of the saturated nitriles of 3 to 4 carbon atoms per molecule.

In accordance with our present invention we utilized these various characteristics of these nitriles in such a manner as to result in an efficient and practical process for the dehydration of the saturated nitriles of 3 to 4 carbon atoms per molecule.

In general, our improved process comprises adding to the water-contaminated nitrile to be dehydrated any other of the previously mentioned nitriles which forms with the contaminating water an azeotrope boiling at a temperature below the boiling point of the pure nitrile to be dehydrated, and distilling off the lower boiling water-nitrile azeotrope from the mixture. The added nitrile is with advantage one which is itself substantially anhydrous. However, small proportions of water may be tolerated, provided that the proportion of water contained in the added nitrile be substantially less than that contained in its water azeotrope. By subjecting the mixture to fractional distillation, the added nitrile is distilled off in the form of its azeotrope carrying with it the water originally present in the nitrile to be dehydrated and leaving behind the substantially anhydrous nitrile product.

The proportion of nitrile to be added will depend upon the amount of water present in the nitrile to be dehydrated and the proportion of water in the water azeotrope of the added nitrile. Allowance should, of course, be made for any water present in the added nitrile.

Because of the relatively low mutual solubilities of most of the respective nitriles in water, the azeotrope of each of these nitriles, with the exception of acetonitrile will, upon condensation, separate into two layers, an upper layer composed of the nitrile saturated with water and a lower layer composed of water saturated with the nitrile. The upper nitrile layer has been found in each instance to contain substantially less water than is contained in the water-azeotrope of that nitrile. The proportions of these nitriles found in the upper and lower layers, respectively, of the condensate of the water azeotrope of the respective nitriles at room temperature, for example, has been found to be as follows, the per cent being based upon the weight of the respective layers:

| Condensate of water azeotrope of: | Upper layer | Lower layer |
|---|---|---|
|  | Per cent | Per cent |
| Acrylonitrile | 96.9 | 7.3 |
| Propionitrile | 93.9 | 7.8 |
| Iso-butyronitrile | 97.4 | 3.3 |
| Normal butyronitrile | 97.1 | 1.6 |

The acetonitrile has been found to be miscible with water and its water azeotrope does not separate upon condensation and cooling to normal temperatures.

In accordance with one aspect of our present invention, the azeotrope distilled from the nitrile-water mixture is condensed and separated into layers by settling and the upper layer returned to the distilling zone for the extraction of further amounts of water. By this procedure the proportion of extraneous nitrile required to effect the dehydration is materially reduced. Only a very small proportion of the added nitrile will be found in the lower water layer and this, if desired, may generally be discarded without considerable economic loss.

The anhydrous or substantially dehydrated nitrile used in accordance with our present invention for removing water from the nitrile to be dehydrated may be prepared by any of the known methods. However, an advantageous method of dehydrating such nitrile, with the exception of acetonitrile, is the dehydration process scribed and claimed in our copending application Serial No. 505,200 filed concurrently herewith, whereby the water-contaminated nitrile is subjected to fractional distillation to drive off the water and a portion of the nitrile as an azeotrope, the azeotrope condensed and settled to form an upper layer composed of the nitrile saturated with water and a lower layer containing the majority of the water from the azeotrope and the upper layer returned to the distilling zone for the removal of further water.

The present invention is distinguished from that of the aforementioned application in that in accordance with our present process the water may be distilled off at a temperature lower than the boiling point of the water azeotrope of the particular nitrile to be dehydrated, thus making possible the use of a lower operating temperature and reducing the tendency of the nitrile to decompose or polymerize.

The operation may be carried out at atmospheric or at a higher or lower pressure. Super-atmospheric pressures are generally not recommended as the tendency of the nitrile to decompose is increased by the resultant higher distillation temperature of the azeotrope.

The operating temperature will depend, of course, upon the particular nitrile being dehydrated and the particular nitrile added thereto as the water carrier. The boiling points of the respective nitriles and their water azeotropes, at atmospheric pressure, have previously been noted herein and the temperature to be used in any particular operation may be readily determined from the data there set forth.

Where the azeotrope distillate is separated into layers and the upper nitrile layer returned to the distilling zone, the temperature to which the distillate is cooled to effect the separation may be varied over a considerable range. However, the proportion of water in the upper layer and of nitrile in the lower layer has been found to decrease with a decrease in separation temperature. Temperatures approximating 20–30° C. or lower have been found desirable but higher temperatures may be used. Operation in accordance with this aspect of our invention may be carried on with particular advantage as a continuous process.

Though in accordance with the present invention any of the previously noted nitriles which forms a water azeotrope boiling at a temperature lower than the boiling point of the nitrile to be dehydrated may be used as the dehydrating agent. The use of acetonitrile or acrylonitrile has been found particularly desirable for this purpose because of the relatively low boiling point of their water azeotropes. However, any of these nitriles other than that to be dehydrated may be used with advantage.

For example, the azeotrope of the acetonitrile contains, by weight, 16% water. Accordingly, for each pound of water to be removed, 5.25 pounds of anhydrous acetonitrile is required. Thus, for completely dehydrating 100 pounds of hydrous propionitrile, for instance, containing 6% water, 31.5 pounds of anhydrous acetonitrile should be added. The mixture is then subjected to fractional distillation and at about 76° C. the water-acetonitrile azeotrope will be distilled off leaving behind substantially anhydrous propionitrile.

Since the water azeotrope of acrylonitrile contains only 13% water, more acrylonitrile than acetonitrile must be distilled off per pound of water removed. However acrylonitrile has the advantage of low mutual solubilities with water and accordingly most of the water of the azeotrope may be separated from the azeotrope distillate and the upper nitrile layer returned to the distilling zone and utilized to carry off additional water. Thus the required amount of acrylonitrile may be greatly reduced.

For example, for each pound of water removed approximately 6.7 pounds of acrylonitrile must be distilled off and completely to dehydrate 100 pounds of hydrous propionitrile containing 6% water, 40.2 pounds of acrylonitrile must be distilled. The total weight of the acrylonitrile azeotrope distillate will be 46.2 pounds and upon separation of this distillate the upper layer will contain 96.9% by weight of acrylonitrile and only 3.1% water and the lower layer will contain only 7.3% of acrylonitrile and 92.7% water. There will be approximately 41.1 pounds of the upper layer and only about 5.1 pounds of the lower water layer formed. Accordingly about 39.8 pounds of the required 40.2 of anhydrous acrylonitrile will be available for reuse and since it contains only 3.1% water it is capable of removing from the nitrile to be dehydrated an additional amount of water equivalent to the difference between the 3.1% water, which it contains, and the 13% water content of its azeotrope.

The water azeotrope of propionitrile and of normal butyronitrile contains even greater proportions of water, as previously noted, and accordingly a proportionately smaller amount of these nitriles need be distilled off in order to remove a given amount of water from the nitrile to be dehydrated. Similar to the acrylonitrile these nitriles, and also iso-butyronitrile, are susceptible to ready separation from the major portion of the water of their azeotropes by settling. However higher temperatures are required for distilling off the water azeotropes of these nitriles.

The operating temperatures and proportions of these nitriles to be used are readily determined from the amount of water to be removed and the data appearing herein.

As previously noted the process may with advantage be operated continuously, the nitrile to be dehydrated and the nitrile for forming the lower boiling azeotrope being supplied continuously to the distilling zone. The vapors passing from the distilling zone are subjected to fractionation and the azeotrope vapors passing from the fractionating zone are condensed, leaving behind the substantially anhydrous nitrile product which may be withdrawn continuously from the still. Where the azeotrope used to carry off water is one of those previously noted as having low mutual solubilities with water, the azeotrope distillate is, with advantage, separated as previously described and the upper layer continuously reduced to the distilling zone.

We claim:

1. A process for the dehydration of water-contaminated, saturated nitriles of 3 to 4 carbon atoms per molecule which comprises adding to the water-contaminated nitrile a nitrile other than that to be dehydrated and which forms with water an azeotrope boiling at a temperature below the boiling point of the water-azeotrope of the nitrile to be dehydrated, subjecting the mixture to fractional distillation and distilling off the water and the added nitrile as an azeotrope.

2. A process for the dehydration of water-contaminated, saturated nitriles of 3 to 4 carbon atoms per molecule which comprises adding to the water-contaminated nitrile a substantially dehydrated nitrile other than that to be dehydrated and which forms with water an azeotrope boiling at a temperature below the water-azeotrope of the boiling point of the nitrile to be dehydrated, subjecting the mixture to fractional distillation and distilling off the water and the added nitrile as an azeotrope.

3. A process for the dehydration of water-contaminated, saturated nitriles of 3 to 4 carbon atoms per molecule which comprises adding to the water-contaminated nitrile a substantially dehydrated nitrile other than that to be dehydrated, selected from the group consisting of acrylonitrile, propionitrile, iso-butyronitrile and normal butyronitrile, and which forms with water an azeotrope boiling at a temperature below the boiling point of the water-azeotrope of the nitrile to be dehydrated, subjecting the mixture to fractional distillation and distilling off the water and the added nitrile as an azeotrope.

4. A process for the dehydration of water-contaminated, saturated nitriles of 3 to 4 carbon atoms per molecule which comprises adding to the water-contaminated nitrile a substantially dehydrated nitrile other than that to be dehydrated and selected from the group consisting of acrylonitrile, propionitrile, iso-butyronitrile and normal butyronitrile, and which forms with water an azeotrope boiling at a temperature below the boiling point of the water-azeotrope of the nitrile to be dehydrated, subjecting the mixture to fractional distillation and distilling off the water and the added nitrile as an azeotrope, condensing the azeotrope vapors, separating the condensate by settling to form an upper layer consisting principally of the nitrile and a lower layer consisting principally of water and returning liquid from the upper layer to the distilling zone.

JOHN W. TETER.
WALTER J. MERWIN.

---

CERTIFICATE OF CORRECTION.

Patent No. 2,388,507.                                November 6, 1945.

JOHN W. TETER, ET AL.

It is hereby certified that error appears in the printed specification of the above numbered patent requiring correction as follows: Page 3, first column, line 38, and second column, line 1, for "water-azeotrope of the boiling point" read --boiling point of the water-azeotrope--; and that the said Letters Patent should be read with this correction therein that the same may conform to the record of the case in the Patent Office.

Signed and sealed this 29th day of January, A. D. 1946.

Leslie Frazer (Seal)                                First Assistant Commissioner of Patents.

The operating temperatures and proportions of these nitriles to be used are readily determined from the amount of water to be removed and the data appearing herein.

As previously noted the process may with advantage be operated continuously, the nitrile to be dehydrated and the nitrile for forming the lower boiling azeotrope being supplied continuously to the distilling zone. The vapors passing from the distilling zone are subjected to fractionation and the azeotrope vapors passing from the fractionating zone are condensed, leaving behind the substantially anhydrous nitrile product which may be withdrawn continuously from the still. Where the azeotrope used to carry off water is one of those previously noted as having low mutual solubilities with water, the azeotrope distillate is, with advantage, separated as previously described and the upper layer continuously reduced to the distilling zone.

We claim:

1. A process for the dehydration of water-contaminated, saturated nitriles of 3 to 4 carbon atoms per molecule which comprises adding to the water-contaminated nitrile a nitrile other than that to be dehydrated and which forms with water an azeotrope boiling at a temperature below the boiling point of the water-azeotrope of the nitrile to be dehydrated, subjecting the mixture to fractional distillation and distilling off the water and the added nitrile as an azeotrope.

2. A process for the dehydration of water-contaminated, saturated nitriles of 3 to 4 carbon atoms per molecule which comprises adding to the water-contaminated nitrile a substantially dehydrated nitrile other than that to be dehydrated and which forms with water an azeotrope boiling at a temperature below the water-azeotrope of the boiling point of the nitrile to be dehydrated, subjecting the mixture to fractional distillation and distilling off the water and the added nitrile as an azeotrope.

3. A process for the dehydration of water-contaminated, saturated nitriles of 3 to 4 carbon atoms per molecule which comprises adding to the water-contaminated nitrile a substantially dehydrated nitrile other than that to be dehydrated, selected from the group consisting of acrylonitrile, propionitrile, iso-butyronitrile and normal butyronitrile, and which forms with water an azeotrope boiling at a temperature below the boiling point of the water-azeotrope of the nitrile to be dehydrated, subjecting the mixture to fractional distillation and distilling off the water and the added nitrile as an azeotrope.

4. A process for the dehydration of water-contaminated, saturated nitriles of 3 to 4 carbon atoms per molecule which comprises adding to the water-contaminated nitrile a substantially dehydrated nitrile other than that to be dehydrated and selected from the group consisting of acrylonitrile, propionitrile, iso-butyronitrile and normal butyronitrile, and which forms with water an azeotrope boiling at a temperature below the boiling point of the water-azeotrope of the nitrile to be dehydrated, subjecting the mixture to fractional distillation and distilling off the water and the added nitrile as an azeotrope, condensing the azeotrope vapors, separating the condensate by settling to form an upper layer consisting principally of the nitrile and a lower layer consisting principally of water and returning liquid from the upper layer to the distilling zone.

JOHN W. TETER.
WALTER J. MERWIN.

---

CERTIFICATE OF CORRECTION.

Patent No. 2,388,507.  November 6, 1945.

JOHN W. TETER, ET AL.

It is hereby certified that error appears in the printed specification of the above numbered patent requiring correction as follows: Page 3, first column, line 38, and second column, line 1, for "water-azeotrope of the boiling point" read --boiling point of the water-azeotrope--; and that the said Letters Patent should be read with this correction therein that the same may conform to the record of the case in the Patent Office.

Signed and sealed this 29th day of January, A. D. 1946.

Leslie Frazer (Seal)  First Assistant Commissioner of Patents.